United States Patent
Muller et al.

(10) Patent No.: US 11,256,516 B2
(45) Date of Patent: Feb. 22, 2022

(54) PROCESSING SYSTEM WITH A MAIN PROCESSOR PIPELINE AND A CO-PROCESSOR PIPELINE

(71) Applicant: XMOS LTD, Bristol (GB)

(72) Inventors: Henk Lambertus Muller, Crosthwaite (GB); Peter Hedinger, Bristol (GB)

(73) Assignee: XMOS LTD, Bristol (GB)

( * ) Notice: Subject to any disclaimer, the term of this patent is extended or adjusted under 35 U.S.C. 154(b) by 0 days.

(21) Appl. No.: 16/965,074

(22) PCT Filed: Dec. 17, 2018

(86) PCT No.: PCT/EP2018/085204
§ 371 (c)(1),
(2) Date: Jul. 27, 2020

(87) PCT Pub. No.: WO2019/154545
PCT Pub. Date: Aug. 15, 2019

(65) Prior Publication Data
US 2021/0109760 A1    Apr. 15, 2021

(30) Foreign Application Priority Data
Feb. 6, 2018 (GB) ..................................... 1801924

(51) Int. Cl.
*G06F 9/38* (2018.01)
*G06F 9/30* (2018.01)

(52) U.S. Cl.
CPC ........ *G06F 9/3867* (2013.01); *G06F 9/30043* (2013.01); *G06F 9/30098* (2013.01);
(Continued)

(58) Field of Classification Search
None
See application file for complete search history.

(56) References Cited

U.S. PATENT DOCUMENTS

| 5,987,597 A | 11/1999 | Miura et al. |
| 6,532,530 B1 * | 3/2003 | Kim ........................ G06F 9/382 |
| | | 712/34 |

(Continued)

FOREIGN PATENT DOCUMENTS

| CA | 2503611 A1 * | 5/2004 | ........... G06F 9/3879 |
| GB | 2 326 253 A | 12/1998 | |
| JP | 2007052664 A * | 3/2007 | |

OTHER PUBLICATIONS

'CSEE 3827: Fundamentals of Computer Systems—Pipelined MIPS Implementation' from columbia.edu, archived on Dec. 29, 2017. (Year: 2017).*

(Continued)

*Primary Examiner* — Steven G Snyder
(74) *Attorney, Agent, or Firm* — Sughrue Mion, PLLC

(57) ABSTRACT

A system comprising a data memory, a first processor with first execution pipeline, and a co-processor with second execution pipeline branching from the first pipeline via an inter-processor interface. The first pipeline can decode instructions from an instruction set comprising first and second instruction subsets. The first subset comprises a load instruction which loads data from the memory into a register file, and a compute instruction of a first type which performs a compute operation on such loaded data. The second subset includes a compute instruction of a second type which does not require a separate load instruction to first load data from memory into a register file, but instead reads data from the memory directly and performs a compute operation on that data, this reading being performed in a pipeline stage of the second pipeline that is aligned with the memory access stage of the first pipeline.

20 Claims, 8 Drawing Sheets

(52) U.S. Cl.
CPC ........ *G06F 9/30145* (2013.01); *G06F 9/3836* (2013.01); *G06F 9/3877* (2013.01)

(56) References Cited

U.S. PATENT DOCUMENTS

| | | | | |
|---|---|---|---|---|
| 6,954,865 | B2* | 10/2005 | Kalambur | G06F 1/3237 713/320 |
| 7,409,520 | B2* | 8/2008 | Basso | G06F 9/3802 711/170 |
| 7,490,221 | B2* | 2/2009 | Evans | G06F 9/3842 708/508 |
| 7,539,847 | B2* | 5/2009 | Kashiwagi | G06F 9/3877 712/34 |
| 7,664,930 | B2* | 2/2010 | Paver | G06F 9/3877 712/34 |
| 7,953,951 | B2* | 5/2011 | Basso | G06F 9/4843 711/170 |
| 8,074,056 | B1* | 12/2011 | Chen | G06F 9/3877 712/214 |
| 2002/0083297 | A1* | 6/2002 | Modelski | G06F 9/30145 712/18 |
| 2004/0044878 | A1* | 3/2004 | Evans | G06F 9/3869 712/34 |
| 2006/0095732 | A1* | 5/2006 | Tran | G06F 9/3826 712/217 |
| 2006/0168583 | A1* | 7/2006 | Basso | G06F 9/3802 718/102 |
| 2007/0180220 | A1* | 8/2007 | Kashiwagi | G06F 9/3877 712/34 |
| 2008/0222394 | A1* | 9/2008 | Basso | G06F 9/3851 712/208 |
| 2011/0161634 | A1 | 6/2011 | Sakaguchi | |

OTHER PUBLICATIONS

'Vector Processors' from Gerhringer and Kenney, CSC 506, NCSU, 1999. (Year: 1999).*
British Search Report of GB1801924.0 dated Jul. 27, 2018.
International Search Report of PCT/EP2018/085204 dated Apr. 18, 2019 [PCT/ISA/210].
Written Opinion of PCT/EP2018/085204 dated Apr. 18, 2019 [PCT/ISA/237].

* cited by examiner

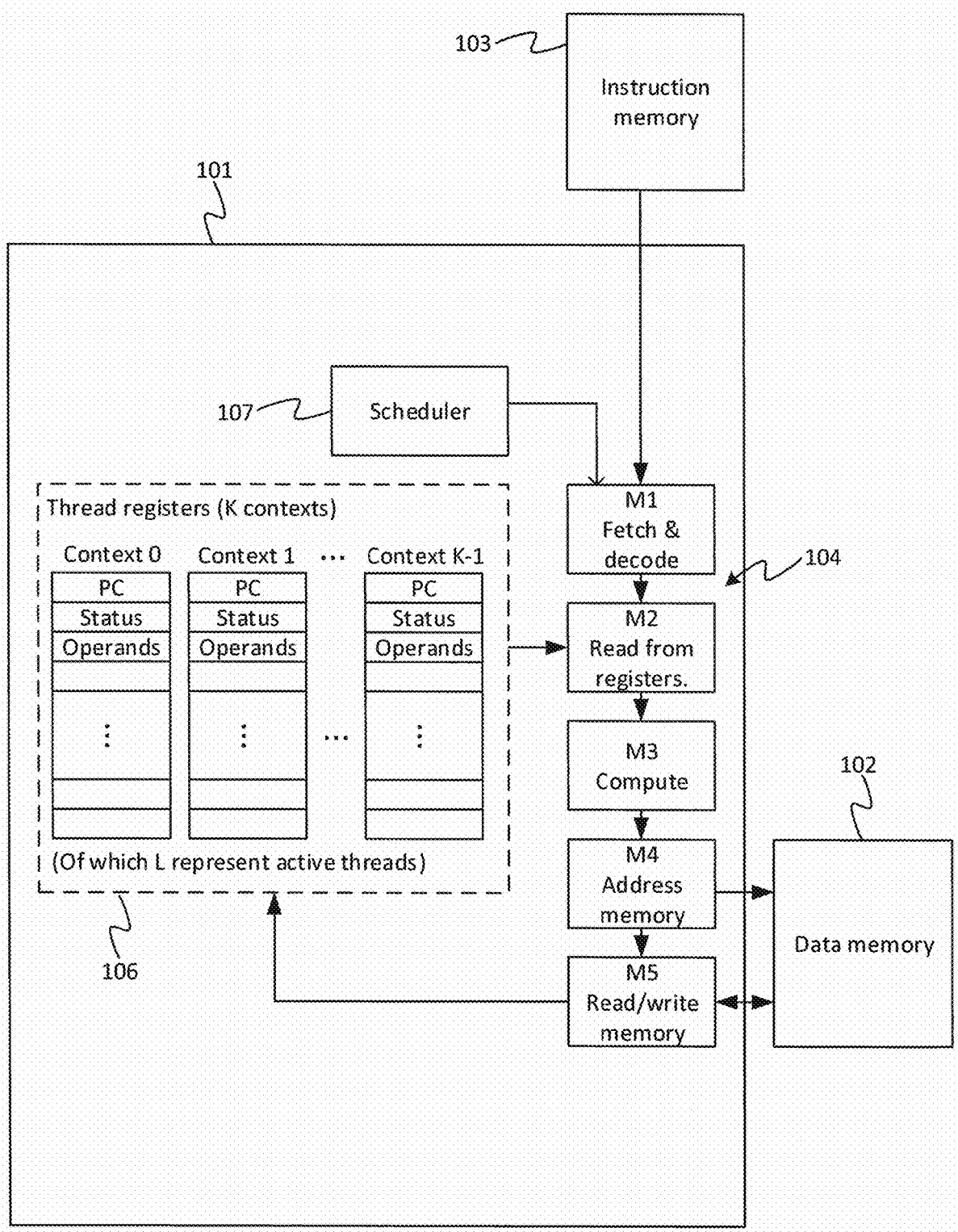

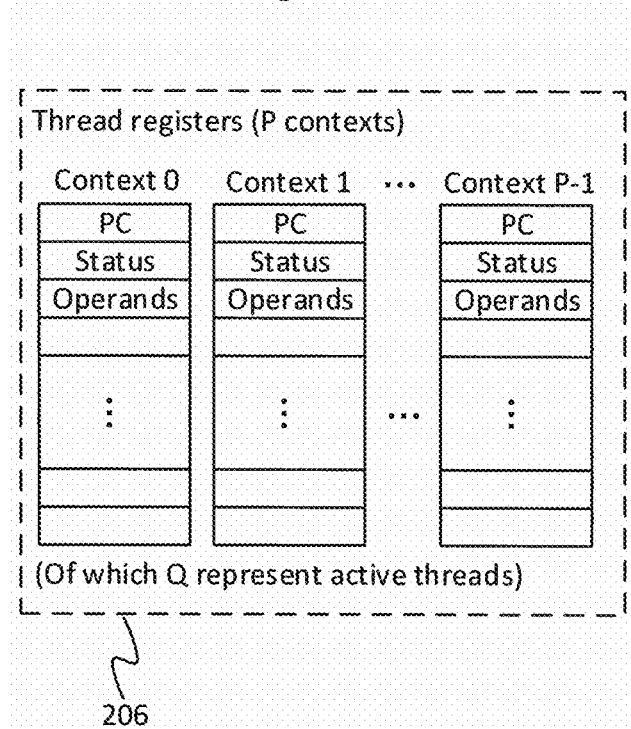

PROCESSING SYSTEM WITH A MAIN PROCESSOR PIPELINE AND A CO-PROCESSOR PIPELINE

CROSS REFERENCE TO RELATED APPLICATIONS

This application is a National Stage of International Application No. PCT/EP2018/085204, filed Dec. 17, 2018, claiming priority to British Patent Application No. 1801924.0, filed Feb. 6, 2018.

TECHNICAL FIELD

The present disclosure relates to a pipelined processing system comprising a series of pipeline stages.

BACKGROUND

The processor architecture of a given processor will be designed to execute instructions instantiated from amongst a particular instruction set. The instruction set of a processor is the fundamental set of definitions of the kinds of machine code instruction that the processor is configured to execute. These will include a number of compute instructions, e.g. arithmetic instructions such as add, multiply, etc. Each instruction executed is an instance of one of the instruction types from the instruction set. Each instruction defined in the instruction set is a machine code instruction formed of an opcode and zero or more operand fields, wherein the opcode specifies the operation to be performed and the operand field(s) (if any) are used to specify one or more operands to be operated upon by the specified operation. An operand can be an immediate operand, i.e. the value to be operated upon is encoded directly into the instruction; or alternatively an operand can take the form of an indirect operand, i.e. an address where the value to be operated upon can be found. For instance an add instruction may take three pointers as operands: two specifying addresses from which to take values to be added, and another specifying a destination address to which to write the result.

In the early days of processors, a compute instruction when executed would cause the execution unit of the processor to read a value directly from a memory address into an implicit, internal register of the execution unit and then perform the compute operation on that value, all in response to a single machine code instruction with a single opcode. However, this led to complex instruction sets where all compute instructions existed with all variants of addressing modes. For example, to support 10 instructions with 4 addressing modes, then one may end up with a full matrix of possible instructions: 4×10 if just a single operand supports all addressing modes, or 4×4×4×10 if three operands support all addressing modes. As a result, not all versions would be created, and compilers had to work out which sequences to create.

Reduced Instruction Set Computers (RISC) were developed based on the philosophy that it is preferable to have small set of simple instructions rather than a large set of complex, dedicated instructions. In contrast to the above-described approach, many RISC processors are instead configured to perform computations based on separate load instructions and compute instructions. That is, first the program will include one or more load instructions that load the value(s) to be operated upon from a memory address into a specified register in a register file, the source memory address and destination register being operands of the load instruction. Only after that, in a separate compute instruction fetched in a separate processor cycle, is the compute operation performed on the value(s) in the register. This reduces the complexity of the instruction set. In turn, this reduced the complexity of the compiler back end, and the complexity of the chip design, enabling higher clock speeds.

So for example, in order to perform an add operation that a CISC (complex instruction set computer) could perform in one instruction, a RISC needs four instructions. A CISC would have an instruction ADD Z, X, Y that adds the contents of memory locations X and Y into Z; whereas a RISC would need to execute a sequence LOAD X, LOAD Y, ADD, STORE Z. The add instruction takes three indirect operands. In the RISC case two of these operands specify register addresses of two respective source registers from which to take values to be added, and the other operand specifies a destination register address to which to write the result. Prior to executing the add instruction, the RISC program will need to include load instructions to load values from a specified memory address into the source registers. After the add instruction the program may then include a store instruction to store the result from the destination register to a specified address in memory (or alternatively may continue to perform cumulative operations on the value in the destination register). The memory addresses and register addresses are operands of the load and store instructions.

A further technique used to improve the efficiency of processors is pipelining. In a pipelined processor, the execution unit is divided into a series of pipeline stages, each for performing a particular type of operation. The pipeline will typically include a fetch stage, decode stage, a register read stage, at least one compute stage, and one or more memory access stages. The instruction fetch stage fetches a first instruction from memory and issues it into the first stage of the pipeline. In the next processor cycle the decoded instruction passes down to the next stage in the pipeline, e.g. the register read stage. At the same time, the fetch stage fetches a second instruction from the instruction memory into the decode stage. In the next successive processor cycle after that, the first instruction is passed to the third pipeline stage, e.g. compute stage, while the second instruction is passed to the second pipeline stage, and a third instruction is issued into the first pipeline stage, and so forth. This helps keep the processor busy and thereby reduces latency, since otherwise the processor would need to wait for a whole instruction to execute before issuing the next into the execution unit.

Yet another technique used to improve the efficiency of processors is multi-threading. In a multi-threaded processor, the processor comprises a plurality of sets of context registers, each set of context registers representing a context (i.e. program state) of a respective one of multiple currently-executing program threads. The program state comprises a program counter for the respective thread, operands of the respective thread, and optionally respective status information such as whether the thread or context is currently active. The processor further comprises a scheduler which is configured to control the instruction fetch stage to temporally interleave instructions through the pipeline, e.g. in a round-robin fashion. Threads interleaved in such a manner are said to be executed concurrently. In the case where the execution unit is pipelined, then as the instruction of one thread advances through the pipeline from one pipeline stage to the next, the instruction of another thread advances down the pipeline one stage behind, and so forth. This interleaved approach is beneficial as it provides more opportunity for hiding pipeline latency. Without the interleaving, the pipeline would need mechanisms to resolve dependencies between instructions in the pipeline (the second instruction may use the result of the first instruction, which may not be ready in time), which may create a pipeline bubble during which the second and further instructions are suspended until the first instruction has completed execution.

SUMMARY

There is a trade-off to be made between the "load-then-compute" approach—i.e. separate load and compute instructions—and the "direct compute" approach—whereby the compute instruction acts on data accessed directly from memory without a separate load instruction to first load into an intermediate register in a register file. On the one hand, the "direct compute" approach results in a large number of steps that have to be performed to execute a single instruction (memory→compute→memory). These kinds of instruction were difficult to pipeline. Hence the invention of RISC: fewer steps are required, so it was easier to build a pipeline, and easier to speed the pipeline up, and as the pipeline is short, the effect of bubbles is less pronounced.

On the other hand, it is recognized herein that the "direct compute" approach may in fact be more efficient in certain circumstances. Although it brings the benefits of the RISC paradigm, it also requires more instructions and therefore greater code density and more processor cycles per operation. This can be particularly cumbersome when performing long or repetitive sequences of compute operations.

To this end, it would be desirable to add one of more additional compute stages capable of such functionality onto a more conventional first pipeline that is based the "load-then-compute" approach so as to provide the programmer or compiler with the option to employ either approach per compute operation. Further, it would be desirable to provide such functionality in the form of a "bolt-on" co-processor module to an existing processor design with a conventional RISC type pipeline. Assuming both main processor and the co-processor share the same data memory, it will also be necessary to do this in way that avoids contention between instructions currently executing in different stages of the pipeline.

According to one aspect of the present disclosure, there is provided a pipelined processing system for executing instructions, wherein for each instruction executed, the instruction passes successively through a series of pipeline stages in a respective successive processor cycle per stage, the system comprising: a data memory; a first processor and a co-processor. The first processor comprises a first register file and a first execution pipeline, the first execution pipeline comprising a series of first pipeline stages including at least a decode stage followed by one or more first compute stages and one or more first memory access stages. The co-processor comprises a second pipeline branching from the first pipeline via an interface between the first and second processors, the second pipeline comprising one or more second memory access stages followed by one or more second compute stages. The decode stage is configured to decode instructions from an instruction set comprising a first subset of instructions and a second subset of instructions, wherein i) for each instruction of the first subset when executed, the instruction passes successively through the stages of the first pipeline in respective processor cycles, and ii) for each instruction of the second subset when executed, the instruction passes successively through the decode stage of the first pipeline, and is subsequently redirected via said interface to pass through the one or more second memory access stages and then the one or more second compute stages of the second pipeline, instead of the one or more first memory access stages and one or more first compute stages of the first pipeline. The first subset comprises a load instruction which causes the one or more first memory access stages to load data from the data memory into a register of the first register file, and further comprises at least one compute instruction of a first type which causes at least one of the one or more first compute stages to perform a compute operation on the data loaded into one of the registers of the first register file. The second subset includes at least one compute instruction of a second type which, without requiring a separate load instruction to first load data from the data memory into a register of a register file, instead causes the one or more second memory access stages to read an item of data from the data memory directly into an internal register of one of the one or more second compute stages in the processor cycle or cycles of the one or more first memory access stages, then causes at least one of the one or more second compute stages, in at least one respective subsequent processor cycle, to perform a co-processor compute operation on the item of data held in said internal register.

Thus there is provided a processing system configured to recognize an instruction set having two subsets of instructions defined therein: a first subset which include load and compute instructions that work in the normal way, and a second subset which comprises at least one special type of compute instruction that, in a single instruction, both accesses memory in the cycle(s) that would otherwise be used by a normal load, then in subsequent cycle(s) causes a one or more subsequent compute stages to perform a compute on this accessed data. Further, by implementing the support for this functionality in a separate co-processor with a secondary pipeline branching off from the main pipeline, this advantageously enables the functionality to be added on to a pre-existing processor design in a modular fashion whilst keeping the existing pipeline intact.

In embodiments the first processor and co-processor are implemented on a same chip. Alternatively the first processor and co-processor are implemented in different chips on the same integrated circuit package, or different chips in different integrated circuit packages on the same board.

Where it is said that the second memory access stages operates in the cycle or cycles of the one or more first memory access stage, this means that an instruction from the second subset starting at the decode stage will pass through the one or more second memory access stages at the same number of cycles from the decode stage as an instruction of the first subset will pass through the one or more first memory access stages. Put another way, the one or more second memory access stages are arranged the same number of cycles through the pipeline from the decode stage as the one or more first memory access stages. So if each pipeline stage is said to be arranged at a respective pipeline position (i.e. level), each position corresponding to one pipeline stage and one cycle such that each instruction passes through one pipeline position per cycle (i.e. each position being a respective "rung on the ladder"), then the one or more second memory access stages are arranged at the same (parallel) pipeline positions as the one or more first memory access. In the case of multiple memory access stages (e.g. an addressing stage and separate read/write stage), this means each memory access stage in the second pipeline is aligned (in terms of pipeline position) with a counterpart memory access stage in the first pipeline. Alternatively the memory access need not be pipelined, i.e. all the memory access functionality including addressing and reading or writing can be combined into a single pipeline stage. In this case the memory access stage in the second pipeline is placed at the same pipeline position as the memory access stage in the first pipeline.

Note also, where a pipeline stage is referred to herein as "following" or "after" another stage, or such like, it will be understood this means that for a given instruction being executed, the instruction will pass into the stage in question in subsequent cycle of the series of processor cycles.

Since the second pipeline forks off from the first pipeline, and the second memory access stage(s) are arranged at the same pipeline depth as the first, this means a given instruction will only ever pass through the first memory access stage(s) or the second stage(s), but not both. So in a given pipeline cycle memory only one of the first and second pipelines can be interfacing with the memory for access to data. Hence contention for the data memory between the two pipelines is avoided.

In embodiments, one or more of the first and/or second type of compute instructions may be arithmetic instructions, and at least one of the first and/or second compute stages respectively may comprise one or more arithmetic computation units for performing the arithmetic operations specified the arithmetic instructions. Other examples of compute operations include for example bitwise manipulation operations.

In embodiments the co-processor preferably comprises a second register file separate from the first register file, wherein the second type of compute instruction writes a result of its compute operation to a destination register of the second register file.

In embodiments, the compute instruction of the second type may cause the decode stage of the first pipeline to send to the second pipeline via said interface: an indication of the co-processor compute operation to be performed, and a memory address from which to access the said item of data upon which the co-processor compute operation is to be performed.

In embodiments, said indication of the co-processor operation may take the form of a decoded opcode of the compute instruction of the second type, as decoded by the decode stage of the first pipeline.

In embodiments, at least one of the cycle or cycles of the one or one or more first compute stages may be used to send said indication and address to the second pipeline in the co-processor.

In embodiments the one or more second compute stages may be a plurality of second compute stages.

In embodiments, the first processor may be operable to execute a number of concurrent threads up to a maximum number, by representing a state of each thread in a respective set of context registers in the first register file and issuing instructions from the different threads into the decode stage of the first pipeline in an interleaved manner.

In embodiments, the system may comprise a forwarding path arranged to avoid dependency conflicts between instructions of the same thread when the number of pipeline stages in the first pipeline or second pipeline is greater than the number of currently executing concurrent threads.

In embodiments the co-processor may also be a multi-threaded processor.

In embodiments, the second register file may also comprise context register sets for representing a program of different ones of the threads when instructions from the second subset are passed to the co-processor.

In embodiments, the co-processor may be a vector processor, said item of data taking the form of a vector, said internal register being a vector register, and the compute operation performed by the instruction of the second type being a vector operation.

In embodiments, either or both of said internal register and said destination register used by the compute instruction of the second type may be wider than the register in the first register file used by the compute instruction of the first type.

In embodiments the second pipeline does not comprise a decode stage, and instead the decode stage in the first pipeline is arranged to decode the opcode of the compute instruction of the second type, said indication comprising the opcode in decoded form as decoded by the decode stage of the first pipeline.

In embodiments, the one or more first compute stages may be followed by the one or more first memory access stages.

In embodiments the first pipeline may comprise a register read stage between the decode stage and the one or more compute stages, wherein the first type of compute stage causes the register read stage to read the data to be operated upon from the first register file.

In embodiments, the compute instruction of the first type may cause one of the one or more first memory access stages to write a result of its compute operation to a register of the first register file.

In embodiments, the second pipeline may comprise a register write stage following the one or more second compute stages, arranged to perform said write to the register of the second register file.

In embodiments the destination register is implicit (a term of art in processor architecture meaning inherent in the opcode rather than being specified by an operand—i.e. an instruction for which a value or register is implicit does not take an operand field to specify that value or register, but instead the value or register in question results automatically from decoding the opcode).

In embodiments, the compute operation performed by the compute instruction of the second type may comprises one of: (a) add together vectors from memory addresses in two implicit registers and store the result in the destination register; (b) add a vector from a memory address found in a register specified by an operand of the instruction of the second type to a vector from a memory address found in an implicit register; (c) add together vectors from addresses in two registers specified by operands of the instruction of the second type; (d) multiply together vectors from memory addresses in two implicit registers and store the result in the destination register; (e) multiply a vector from a memory address found in a register specified by an operand of the instruction of the second type to a vector from a memory address found in an implicit register; (f) multiply together vectors from addresses in two registers specified by operands of the instruction of the second type; (g) a vector strided load and add, which adds together vectors from a series of memory addresses starting from a base address and offset from one another by a stride, and stores the result in an implicit register, the base address and stride being taken from register specified by operands of the instructions; or (h) a vector strided multiply and add, which multiplies together vectors from a series of memory addresses starting from a base address and offset from one another by a stride, and stores the result in an implicit register, the base address and stride being taken from registers specified by operands of the instructions.

In embodiments the second subset may comprise multiple compute instructions of the second type. These may comprise any or all of the above.

Note: where certain features of the system are recited above, in the claims or elsewhere herein in terms of a functional feature of an instruction, it will be understood that this is a short-hand for saying that the relevant pipeline or pipeline stage is configured to perform that function upon execution of the instruction.

According to another aspect disclosed herein, there is provided a method of operating a pipelined processing system for executing instructions, wherein for each instruction executed, the instruction passes successively through a series of pipeline stages in a respective successive processor cycle per stage, and wherein the system comprises: a data memory; a first processor comprising a first register file and a first execution pipeline, the first execution pipeline comprising a series of first pipeline stages including at least a decode stage followed by one or more first compute stages and one or more first memory access stages; and a co-processor comprising a second execution pipeline branching from the first pipeline via an interface between the first and second processors, the second pipeline comprising one or more second memory access stages followed by one or more second compute stages. The method comprises: operating the decode stage to decode instructions from an instruction set comprising a first subset of instructions and a second subset of instructions, wherein i) for each instruction of the first subset when executed, the instruction passes successively through the stages of the first pipeline in respective processor cycles, and ii) for each instruction of the second subset when executed, the instruction passes successively through the decode stage of the first pipeline, and is subsequently redirected via said interface to pass through the one or more second memory access stages and then the one or more second compute stages of the second pipeline, instead of the one or more first memory access stages and one or more first compute stages of the first pipeline; wherein the first subset comprises a load instruction which causes the one or more first memory access stages to load data from the data memory into a register of the first register file, and further comprises at least one compute instruction of a first type which causes at least one of the one or more first compute stages to perform a compute operation on the data loaded into one of the registers of the first register file; and wherein the second subset includes at least one compute instruction of a second type which, without requiring a separate load instruction to first load data from the data memory into a register of a register file, instead causes the one or more second memory access stages to read an item of data from the data memory directly into an internal register of one of the one or more second compute stages in the processor cycle or cycles of the one or more first memory access stages, then causes at least one of the one or more second compute stages, in at least one respective subsequent processor cycle, to perform a co-processor compute operation on the item of data held in said internal register.

In embodiments, the method may comprise steps in accordance with any of the system features disclosed above or elsewhere herein.

BRIEF DESCRIPTION OF THE DRAWINGS

To assist understanding of the present disclosure and to illustrate how embodiments may be put into effect, reference is made, by way of example only, to the accompanying drawings in which:

FIG. 1 is a schematic block diagram of a multithreaded processor,

FIG. 4 is a schematic timing diagram showing multiple threads flowing through successive pipeline stages including a co-processor pipeline, FIG. 6 is another schematic timing diagram showing multiple threads flowing through successive pipeline stages including co-processor pipeline, and FIG. 7 is a schematic block diagram of a register file of a multi-threaded co-processor.

DETAILED DESCRIPTION OF EMBODIMENTS

Figure 1A:
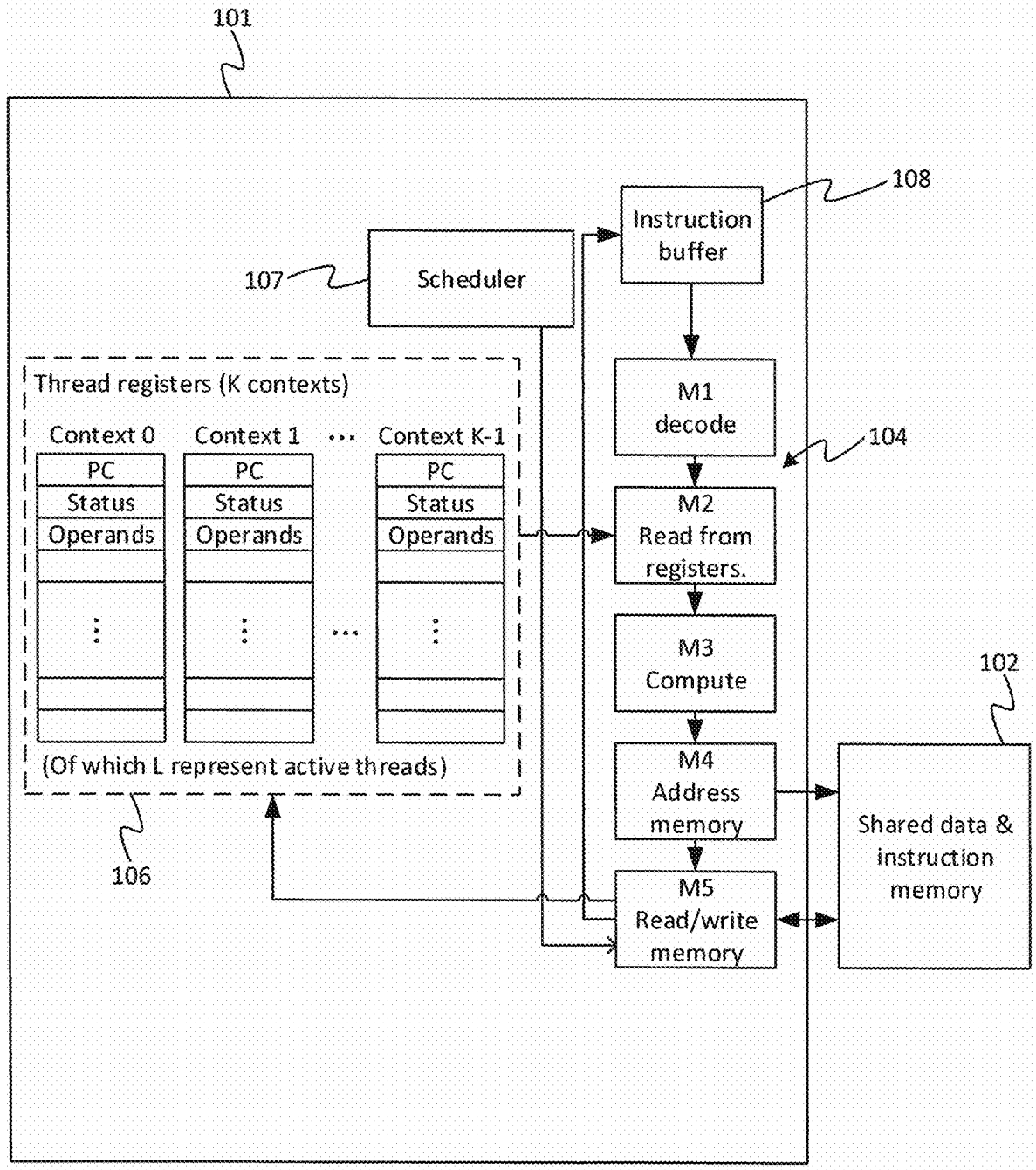
FIG. 1A is another schematic block diagram of a multithreaded processor.

The present disclosure provides a system which extends a first pipeline with a supplementary pipeline comprising one or more additional compute stages, wherein the supplementary pipeline can perform direct-compute type operations on data taken directly from memory by a compute instruction. In embodiments this is implemented by adding a memory-based co-processor interface to a multi-threaded host processor.

FIG. 1 illustrates an example processing system comprising a first processor 101—the host or "main" processor—with which the co-processor may be employed. The main processor 101 comprises a first pipeline 104 comprising a series of pipeline stages M1 ... M5. For example, stage M1 may be a fetch & decode stage that fetches and decodes the instruction, stage M2 may be a register read stage that reads from a register file, stage M3 may be a compute stage that performs computations (e.g. arithmetic operations), and M4 and M5 may be memory access stages wherein stage M4 may address memory and stage M5 may read and write data to memory, depending on the instruction.

Note: five particular pipeline stages M1 ... M5 are illustrated here by way of example but this is not limiting, and the skilled will be aware of other possible pipeline variants. For instance M4 and M5 could be combined to perform the addressing and read or write in the same cycle, and/or the compute stage could be divided into multiple compute stages. And/or, the fetch & decode stage M1 could be separated into a separate fetch stage M0 and decode stage M1', taking two respective cycles to fetch an instruction and then decode it.

Preferably all pipeline stages are designed to have approximately the same logic depth. That is, they will all take the same amount of time to complete. The slowest pipeline stage dictates the execution speed of the whole system. Say there were three stages that take 2, 6, and 2 ns to complete, respectively, then the clock would be limited to $\frac{1}{6}$ ns=166 MHz. However if the second stage can be split into three stages that take 2 ns each, then the clock speed can go up to 500 Mhz. So, if a very complex instruction is added to instruction set of the pipeline (say, square root), then it may be desirable to split the compute amongst a few pipeline stages to stop a single pipeline stage from dominating the clock speed of the whole system.

The main processor 101 comprises a scheduler 107 coupled to the fetch & decode stage M1 (or separate fetch stage M0, not shown). The memory access stages M4 and M5 are coupled to a data memory 102. The input of the instruction fetch & decode stage M1 (or separate fetch stage M0) is coupled to a separate instruction memory 103. The main processor 101 also comprises a register file 103, which comprises a bank of thread registers (i.e. context registers) 106, made up of K sets of context registers. Each of the K context register sets is arranged to represent the program state of a different respective one of multiple program threads. Each set of context registers comprises at least a program counter (PC) and a plurality of operand registers.

The threads themselves (i.e. the sequences of instructions) are stored in the instruction memory 103 (i.e. program memory). The program counter in each context register set defines the current point in the code for the respective thread, i.e. the current address from which instructions are to be fetched from memory 103 for the respected thread. The operand registers are for temporarily holding values to be operated upon, or resulting from, operations performed by the instructions of the respective threads. Each set of context registers may optionally also comprise one or more status registers recording a current status of the respective thread or its context registers, such as whether the context currently represents an active thread. The reason for an inactive status could for example be that the thread is paused (e.g. awaiting some condition such as input of data), or simply that the context register set happens to be unclaimed (at any one time the program need not necessarily comprise the maximum number of K concurrent threads). In general, at any given time, L of the K contexts may represent active threads where L is any number from zero to K. In certain embodiments the maximum number K of concurrently executable threads is eight.

The scheduler 107 is arranged to control the instruction fetch & decode stage M1 (or fetch stage M0) to fetch instructions from the current PC value of each currently active thread in an interleaved manner, typically according to a round-robin or weighted round robin scheme, as discussed in the background section. In embodiments this is implemented as follows. The scheduler 107 decides which thread is going to be pushed through the pipeline 104 next; this in turn will cause the instruction fetch to be activated, etc. The scheduler 107 provides the context identifier (a number between 0 and K−1) to the first stage of the pipeline, which may be the fetch & decode stage M1 of FIG. 1, a dedicated fetch stage M0 in a variant of FIG. 1 not illustrated, or the instruction decode M1 of FIG. 1A (to be discussed shortly). This context identifier is passed on to subsequent stages M2, M3 . . . on each processor clock cycle, making sure that each pipeline stage operates on the correct context.

Each fetched instruction is issued into the first pipeline stage M1 in the sequence of pipeline stages M1 . . . M5 formed by the pipeline 104. The effect is that at any given time during the execution of the overall program, different ones of the pipeline stages M1 . . . M5 are occupied by instructions from different ones of the concurrently executing threads. For instance in the unweighted round robin case, each successive pipeline stage is occupied by an instruction from a different one of the threads, one behind another. The instructions advance through the pipeline one stage per cycle (that being the definition of a stage in the sense of an execution pipeline).

Another variant is shown in FIG. 1A. Here instructions are fetched from an instruction buffer 108 instead of straight from a dedicated instruction memory 103. In this case the instruction buffer 108 may be filled from the same memory 102 as used to store the data. In such embodiments, the memory access stage(s) M4, M5 may be used to pre-fetch instructions from the memory 102, 103 into the instruction buffer 108 when unoccupied by other memory accesses. This may be an inherent automated function of the memory access stage(s) M4, M5, or alternatively may be performed by load instructions inserted into the program for this purpose by the compiler. Either way, the instruction buffer 108 automatically issues one of the buffered instructions into the top of the pipeline 104 per cycle, but without itself occupying a processor cycle to do so.

Consider now the following illustrative situation. In a first processor cycle, an instruction of a first thread is issued into the decode stage M1 where it is decoded in that cycle. In the second consecutive cycle, the first thread's instruction advances to the register read stage M2, where values from any source registers specified by any operands of the instruction are read from the respective operand registers in the register file 103 ready for use by the following compute stage M3. Also in the second cycle, an instruction of a second thread is issued into the decode stage and decoded. In the third consecutive processor cycle, the first thread's instruction advances to the compute stage M3 and causes the compute stage to perform the operation defined in the opcode of the instruction, which may comprise operating upon any values read by the preceding register read stage M2. In this third cycle, the second thread's instruction also advances to the register read stage M2, while an instruction of a third thread is issued into the decode stage M1.

In the fourth consecutive processor cycle, the first thread's instruction advances to the memory addressing stage M4, the second thread's instruction advances to the compute stage M3, the third thread's instruction advances to the register read stage M2, and an instruction of a fourth thread is issued into the decode stage M1. In the fifth consecutive processor cycle, the first thread's instruction advances to the memory read/write stage M5, while the second to fourth instructions each advance down the pipeline by one pipeline stage accordingly, and an instruction of a fifth thread is issued into the decode stage M1. In the sixth consecutive cycle, if there are only five active threads (L=5), then the next instruction to be issued into the decode stage M1 at the top of the pipeline is the next instruction of the first thread, whilst the first instructions of the second to fifth threads advance one stage down the pipeline. In the next consecutive cycle the second instruction of the second thread enters the pipeline while the others shift down, and so forth. The process continues like this in a cyclical manner.

Thus multiple threads are interleaved in different respective time slots and the pipeline 104 is kept busy with instructions from different threads. If one thread becomes inactive, its timeslot need lot lie empty. Rather, the round-robin cycle may reduce to repeating with one fewer time slot per round so that an empty "bubble" is not left in the pipeline 104. Or alternatively the inactive thread's time slot and context register set may be allocated to another thread, either one of the currently executing threads or another program thread from the program memory (though the latter case incurs the penalty of saving the program state of the inactive thread and loading the new thread).

The operation of the memory access stages M4 and M5 depends on the type of instruction. If it is a compute instruction then at least one of them acts to store the result of the computation performed by the compute stage M3 in a destination register in the register file 106 (in one of the respective operand registers of the relevant thread). The destination register may be specified by an operand of the compute instruction. If on the other hand the instruction is a store instruction, the memory access stages M4, M5 store a value from a one of the registers in the register file 106 to an address in the data memory 102. The register address and memory address may be specified by operands of the instruction. E.g. this may be used to store the result of a computation performed by the compute stage M3. If the instruction is a load instruction, the memory access stages M4, M5 load a value from an address in the data memory 103 to one of the registers in the register file 106. The register address and memory address may again be specified by operands of the instruction. E.g. this may be used to load the input values to be operated upon by a computation performed by the compute stage M3 when executing a subsequent compute instruction of the same thread.

Note: FIGS. 1 and 1A illustrate by way of example a pipelined memory where memory access is divided into (at least) two stages: memory addressing stage M4 which compute the memory address and provides the computed address to the memory device 102, and a separate read/write stage M5 which reads or writes to memory 102 (depending on whether a load or store instruction is being executed). However in other variants, not illustrated, it is instead possible to employ a non-pipelined memory with both operations combined into a single memory access pipeline stage (requiring only one processor cycle per memory access operation).

Note also: typically one would separate the notion of storing to the register file and the memory access stage. Accessing memory takes, say, two cycles. For example, to load data stage M4 would present the address, and get the result back from the memory 102 in stage M5. For a store, stage M4 would pass the address and data to the memory 102, and in stage M5 the store would take effect. In addition, the memory address has to be computed. This may involve reading the base address from a register, reading the index from a register, and computing the sum of the two. All of this makes memory slow, e.g. occupying two or three pipeline stages (if including address computation) or even four pipeline stages (if including loading address values from registers). Registers are faster, and don't require computing an address. So, typically the pipeline 104 is either filled using register read, multiply, and register write; or it is filled with register read, address compute, memory access, and register write. The register write could be implemented as part of M5 as shown in FIG. 1, or alternatively in a separate subsequent pipeline stage M6 (not shown).

The data memory 102 is the memory where the data to be operated upon by computations and the results of the computations are ultimately stored (the operand registers being only a temporary holding place). In embodiments such as shown in FIG. 1, the instructions are stored in, and fetched from, an instruction memory 103 that is separate from the data memory 102. These may be separate memory devices or separate regions of the same memory device. Either way, since the instruction memory 103 and data memory 102 have non-overlapping address spaces, this means there is no risk that the instruction fetches performed by the fetch stage 103 will contend with the data access (load or store) being performed by the memory access stages M4, M5.

The processor 101 is designed so that multiple threads can access memory without contention. As outlined above, access to memory is time-sliced, enabling each thread in turn to access memory. This is achieved by running threads behind each other through the pipeline, and placing the memory access stage(s) somewhere in the pipeline 104. In the case shown in FIG. 1A, the system may be designed so that instruction accesses and data accesses use the same memory 102 and same pipeline stages M4, M5. In that case, said pipeline stages can be used to either access data, or to pre-fetch instructions.

Figure 2:
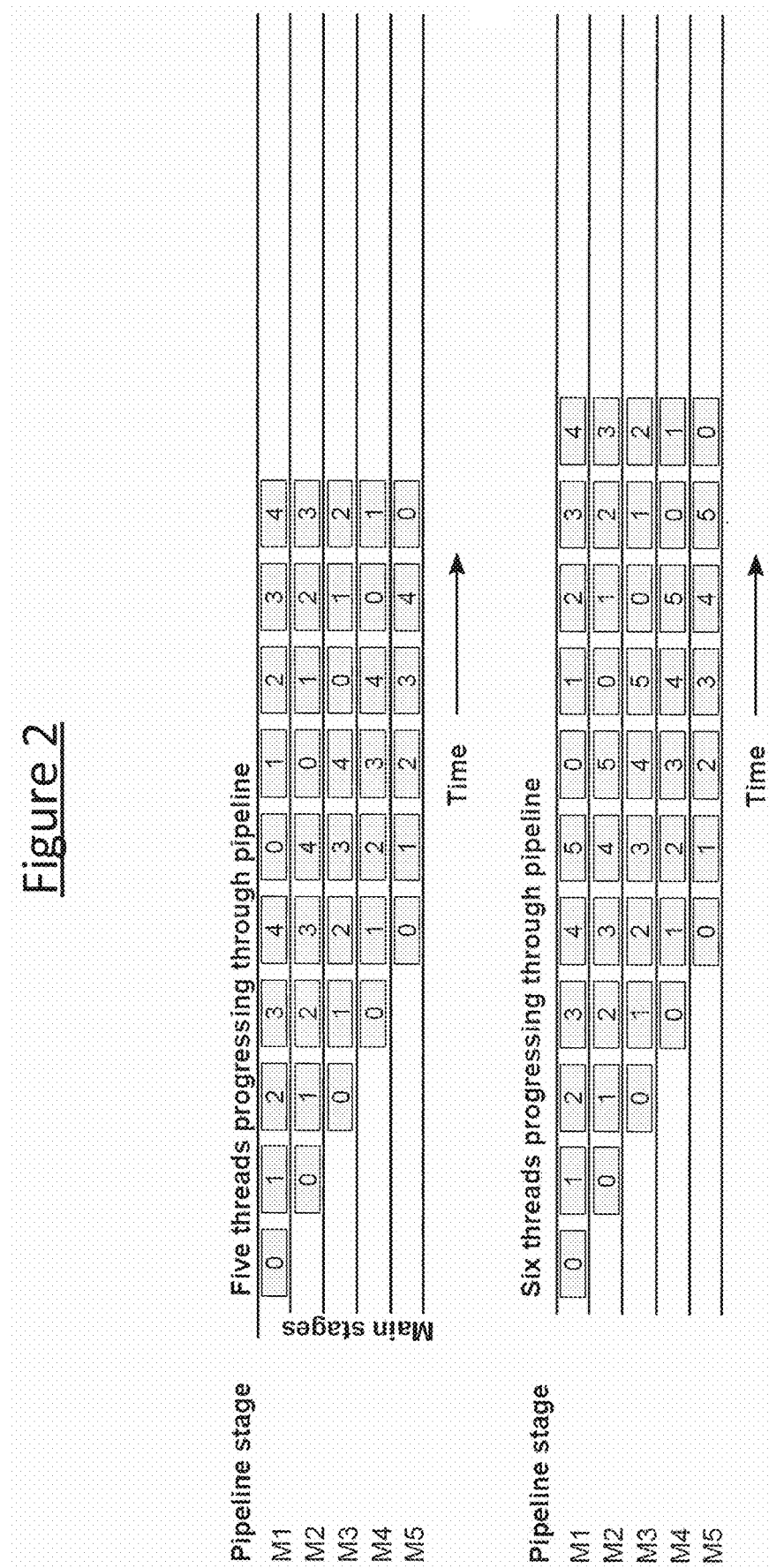
FIG. 2 is a schematic timing diagram showing multiple threads flowing through successive pipeline stages of a multithreaded processor.

As a running example, consider the case where the pipeline 104 may have five stages as is shown in FIG. 1 or 1A. FIG. 2 shows how the system works with five and six active threads.

When the above pipeline is used to implement a traditional register-to-register RISC like instruction set, then operations on large sets of data typically involve a sequence of instructions. Say it is desired to compute the sum of a list of numbers, then the typical sequence would be to LOAD subsequent elements of this list of numbers, and add each value to an accumulator held in a register. That is, the first operation will be to LOAD data from memory to the register file, and the second operation will be to take this data out of the register file and perform an operation on it.

Embodiments provide a co-processor interface that enables a co-processor to perform operations directly on the memory contents, without having to load and store data in the thread's register file. This has a number of advantages. Firstly, the co-processor can operate on data that is wider than the thread-context; it can have a select few registers that are as wide as the memory and that can hold, for example, vector data. This will enable wide SIMD operations. Secondly, the co-processor can operate on data that comes from memory without storing it in an intermediate register. This will reduce the number of issue slots required to complete an operation as we can amalgamate the LOAD operation and the computation on the data into a single instruction.

As an example, the co-processor could have a very small set of very wide registers (say, 256 bits), and a 256-bit wide interface to memory, enabling a the co-processor to load 256 bits of data and operate on them in a single cycle.

One challenge however is to preserve the contention free access to memory for all threads, including the co-processor activity. For this purpose, the co-processor pipeline is organized so that its memory access stages can operate in the slots that would otherwise be used in the main pipeline. Hence, each thread can either allocate its memory access slot to the main pipeline, or to the co-processor pipeline. This is shown in FIG. 3.

Figure 3:
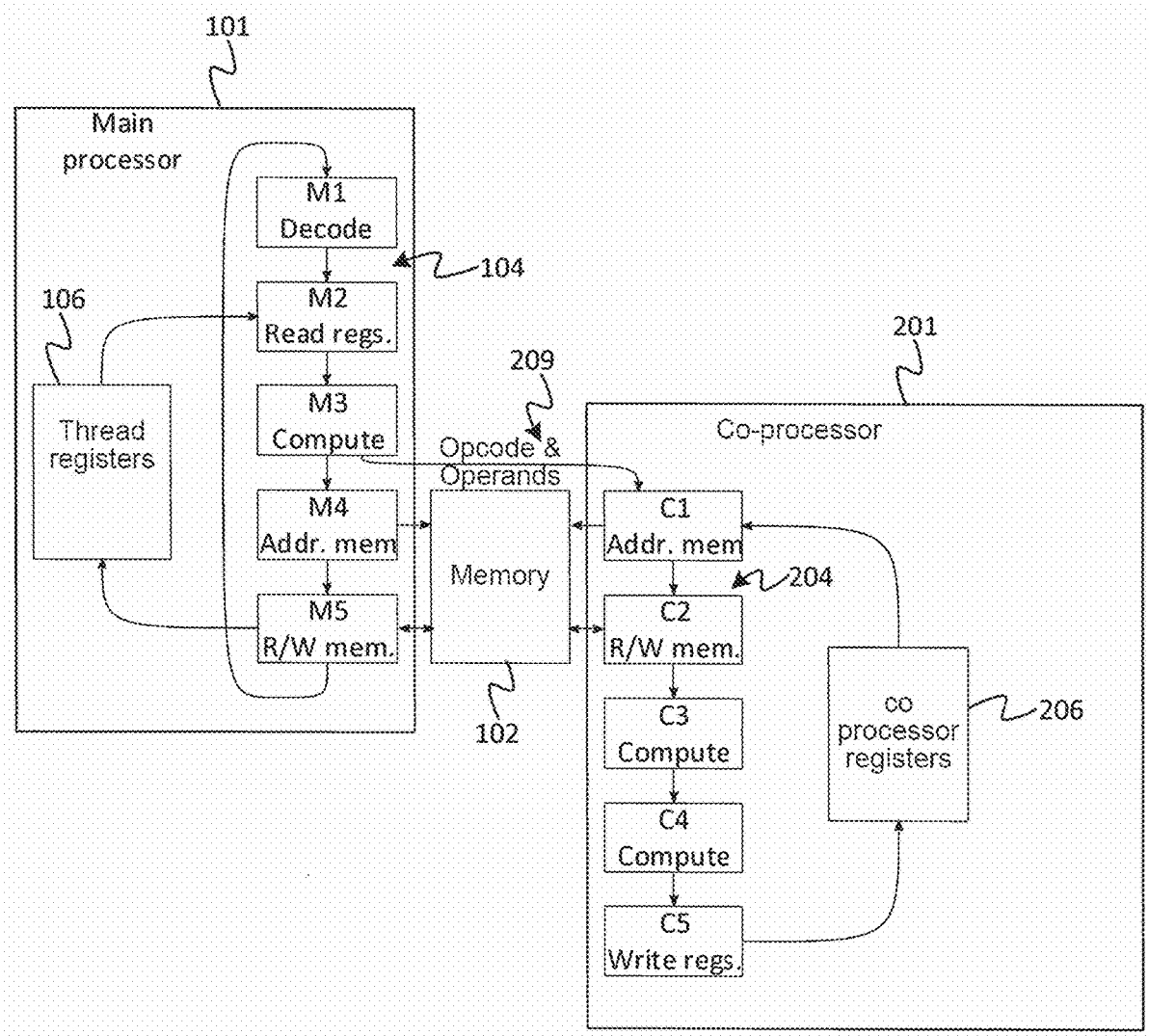
FIG. 3 is a schematic block diagram of a multithreaded processor with co-processor.

FIG. 3 illustrates how the pipeline of the main processor 101 may be extended with a second, supplementary pipeline 204 which adds the above-mentioned functionality. The supplementary pipeline 204 is implemented in a separate co-processor coupled to the main processor via an inter-processor interface 209. In embodiments the main processor 101 and co-processor 201 are implemented on the same chip (i.e. same die), but as a separate module that can be readily added on to an existing design of the main processor 101. In this case the inter-processor interface 209 takes the form of one or more conducting lines (e.g. a 32-bit wide connection) formed on the same chip. In alternative embodiments the main processor 101 and co-processor 201 may even be implemented on separate chips, either in the same integrated circuit (IC) package, or in different IC packages on the same board. In these cases the interface 209 may take the form of one or more wires formed between chips, e.g. through the seal rings of the dies in the case of the same IC package, or on the circuit board via suitable pins in the packages in the case of different IC packages.

The main processor 101 may be that of FIGS. 1, 1A or any other form of pipelined processor. In the case of the instruction buffer 108 and shared memory 102 as in FIG. 1A, the instruction buffer is filled when neither the main processor nor the co-processor is using memory.

The co-processor 201 comprises a second pipeline 204 that branches (forks) off from the pipeline 104, the second pipeline comprising its own memory access stage(s) (e.g. C1, C2) and one or more second compute stages (e.g. C4, C5). The co-processor 201 comprises its own register file 206 independent of the register file on the main processor 101. However, the co-processor 201 is coupled to the same data memory 102 as the main processor 101, and is arranged to access this same data memory 102 to take values to perform computations on and to store results of computations. The second memory access stage(s) C1, C2 is/are arranged to access the data memory for the second instruction type in the same processor cycle as the first memory access stage(s) M4, M5 would for the load instruction of the first instruction type. The second compute stage(s) C3, C4 are placed after the memory access stages M4, M5, C1, C2, i.e. so they perform their respective operations in processor cycles occurring subsequent to the memory accesses.

In embodiments as illustrated in FIG. 3, the secondary pipeline 204 may comprise five stages. Stages C1 and C2 are memory access stages, wherein C1 addresses memory, and stage C2 reads from and writes to the data memory 102 and reads from the co-processor register file 206, depending on the instruction being executed. Stages C3 and C4 are compute stages which perform computation (e.g. arithmetic operations). Stage C5 is a register write stage which writes results of the computations performed by the compute stage(s) C3, C4 to the co-processor register file 206. Note: the reason it is preferable to have multiple compute stages in embodiments, is to balance the pipeline as discussed previously (i.e. a single, slow compute stage would dominate the pipeline speed). However this is not essential.

In embodiments the co-processor 201 is a vector processor, sometimes also referred to as a single-instruction multiple-data (SIMD) processor. A vector in this sense means an item of data that comprises multiple individual elements. When a vector instruction is executed in a vector processor, it performs its operation on each of the elements in parallel. So for instance consider a vector add instruction with two source vectors $(u_0, u_1, u_2, \ldots u_{J-1})$, $(v_0, v_1, v_2, \ldots v_{J-1})$ as operands, and a destination vector register for holding a result comprising J elements. The opcode of a single instance of this add instruction would then add $v_0$ to $u_0$ and store the result in element 0 of the destination register, and add $v_1$ to $u_1$ and store the result in element 1 of the destination register, etc., all at once in the same processor cycle. I.e. it performs the vector calculation $(u_0, u_1, u_2, \ldots u_{J-1}) + (v_0, v_1, v_2, \ldots v_{J-1})$.

The secondary pipeline 204 runs synchronously with the primary pipeline 104, and forks off the main pipeline 104 in such a way so that the secondary pipeline 204 can access the data memory 102 instead of the first pipeline 104. The secondary pipeline 204 is configured to execute instructions of a type 'LOAD and operate' type (i.e. direct compute type). As such it will have additional pipeline stages (e.g. C3, C4, C5) that will extend beyond the primary pipeline 204 (note that the vertical positions of the stages M1-C5 in the figures represent successive processor cycles). These additional stages C3, C4, C5 can completely overlap with the primary pipeline 104, enabling both pipelines to operate in synchrony at full rate, serving a multitude of threads.

In the example embodiment illustrated in FIG. 3, the decode stage of the primary pipeline 104 is configured to decode an additional class of co-processor instructions which will ultimately be processed by the co-processor. The co-processor instructions are a subset of the instruction set recognized by the decode stage M1 of the main pipeline 101. These may for example include a co-processor vector add instruction, co-processor vector multiply instruction, and so forth.

Each type of co-processor instructions may take zero or more operands. Where present, the operands may specify an address in the memory upon which the instruction operates. Note that as at least one of the co-processor compute instructions is of the direct-compute type, the operand of such a compute instruction may specify a memory address (as opposed to a register address). This memory address may be specified in the form of an indirect operand, i.e. pointing to a register address where the memory address is to be found. Hence in embodiments, when the co-processor compute instruction advances to the register-read stage M2 in the main pipeline in the cycle following the decode stage M1, it causes the register-read stage M2 to look-up one or more memory addresses in a register of the register file 106 (from the context registers of the respective thread).

During the next successive processor cycle, i.e. that normally used by the compute stage M3 for regular instructions executed fully through the main pipeline 104 (i.e. instructions other than the co-processor instructions), the main processor 104 sends an indication of the co-processor instruction to the top of the co-processor pipeline via the inter-processor interface 209. This indication sent over the interface 209 comprises two pieces of information: (a) the opcode of the co-processor instruction in decoded form as decoded two cycles back by the decode stage M1 of the main pipeline; and (b) any operands of the instruction, in the form of memory addresses as read from the register file 106 of the main processor 101 by the register-read stage M2 of the main pipeline one cycle ago. Or if the co-processor instruction takes zero operands, only (a) is needed.

The co-processor instruction then advances down the second pipeline 204, one stage per cycle. In doing so it causes the memory access stage(s) C1, C2 to access, in the shared data memory 102, data from the address(es) received as operand(s) from the main pipeline 104; and then causes the compute stage(s) to perform the computation on this data as specified by the decoded opcode received from the main pipeline 104. Note again that both the reading of the data from memory and the compute are performed in response to a single opcode of a single instance of one of the co-processor instructions. This same instruction then causes the register write stage C5 to store the result of the computation in a register of the co-processor register file 206. The result can subsequently be stored from the co-processor register file 206 to the shared data memory 102 by a subsequent co-processor store instruction which acts on the co-processor memory stage(s) C1, C2.

The memory access stage(s) C1, C2 of the second pipeline 204 are aligned with their counterpart(s) M4, M5 in the first pipeline 104 in terms of how far along the pipeline they are from the decode stage M1 (i.e. how many stages or cycles they are from the decode stage M1). Put another way, they are at the same pipeline position or level (the same number of cycles or stages deep into the pipeline). In this case of multiple memory access stage stages per pipeline, this means each memory access stage C1, C2 in the second pipeline is aligned with its corresponding stage M4, M5 in the first pipeline (so in the example shown the second pipeline's memory addressing stage C1 is aligned with (at the same pipeline position as) the first pipeline's memory addressing stage M4, and the second pipeline's read/write stage C2 is aligned with the first pipeline's read/write stage M5). Alternatively in the case of a single combined memory access stage performing both addressing and read/write stage in a single cycle, the second pipeline's single memory access stage is simply aligned at the same pipeline position as the first pipeline's single memory access stage.

Since a given instruction will either continue down the main pipeline 104, or fork off into the second pipeline 104, but cannot do both; then this means that in a given cycle, only one of the memory access stages at a given pipeline position (a given number of cycles or stages into the pipeline) can be occupied by that instruction in the current cycle. Hence contention between the two pipelines 104, 204 for memory access is avoided.

Apart from the opcodes and operands of the co-processor instructions sent over the inter-processor interface 209, in embodiments all communication between the main processor 101 and the co-processor 201 is via the shared data memory 102. For example the main processor 101 can set-up a vector in memory 102, leave the co-processor to perform the vector calculation, and then pick up the result from the memory 102.

Note: in embodiments the co-processor cannot autonomously issue its own instructions. The program is pointed to by the PC, which is part of the main processor 101. The main processor 101 may set the co-processor a task which takes multiple cycles to complete though, so it can press on with its given piece of work until completion, but its instructions will always be issued through the main processor 101.

Note also that as multiple threads are being executed concurrently (in an interleaved fashion), then as one co-processor instruction originating from one thread run on the main processor 101 advances down the co-processor pipe 204, another instruction originating from another thread run on the main processor may follow one cycle behind down the co-processor pipe 204, and so forth, in a similar manner as described in relation to the main pipeline.

In embodiments, the co-processor register file 206 has separate context register sets to support multiple threads running through the co-processor pipeline 204, as illustrated in FIG. 7.

The number of thread contexts supported by the co-processor is a design parameter that can be chosen independently of the number of thread contexts supported by the primary pipeline. In case where the cost per thread context in the co-processor is high, one can chose to only allow the co-processor to be utilised by a limited number of thread contexts, saving silicon area. In general there do not have to be the same number as in the main processor register file 106, though that is one possibility in embodiments. Given K contexts in the main processor, the co-processor may have P contexts, P≤K, (P greater than K is pointless). In this case, there an association is provided between the main thread context number (that passes through the pipeline), and the co-processor context. For example, part of the co-processor register file 206 is a resource identifier (a number) that identifies the main processor context that the co-processor context relates to. In the case of the co-processor a resource identifier can be allocated one to a thread, the thread will now have a co-processor context identifier that it is using, and (a) it can pass this through the pipe explicitly, or (b) it can be stored behind the scenes, or (c) the co-processor can store for each of its contexts which main context it belongs to and perform a lookup in stage M1 to select the right context.

Figure 4:
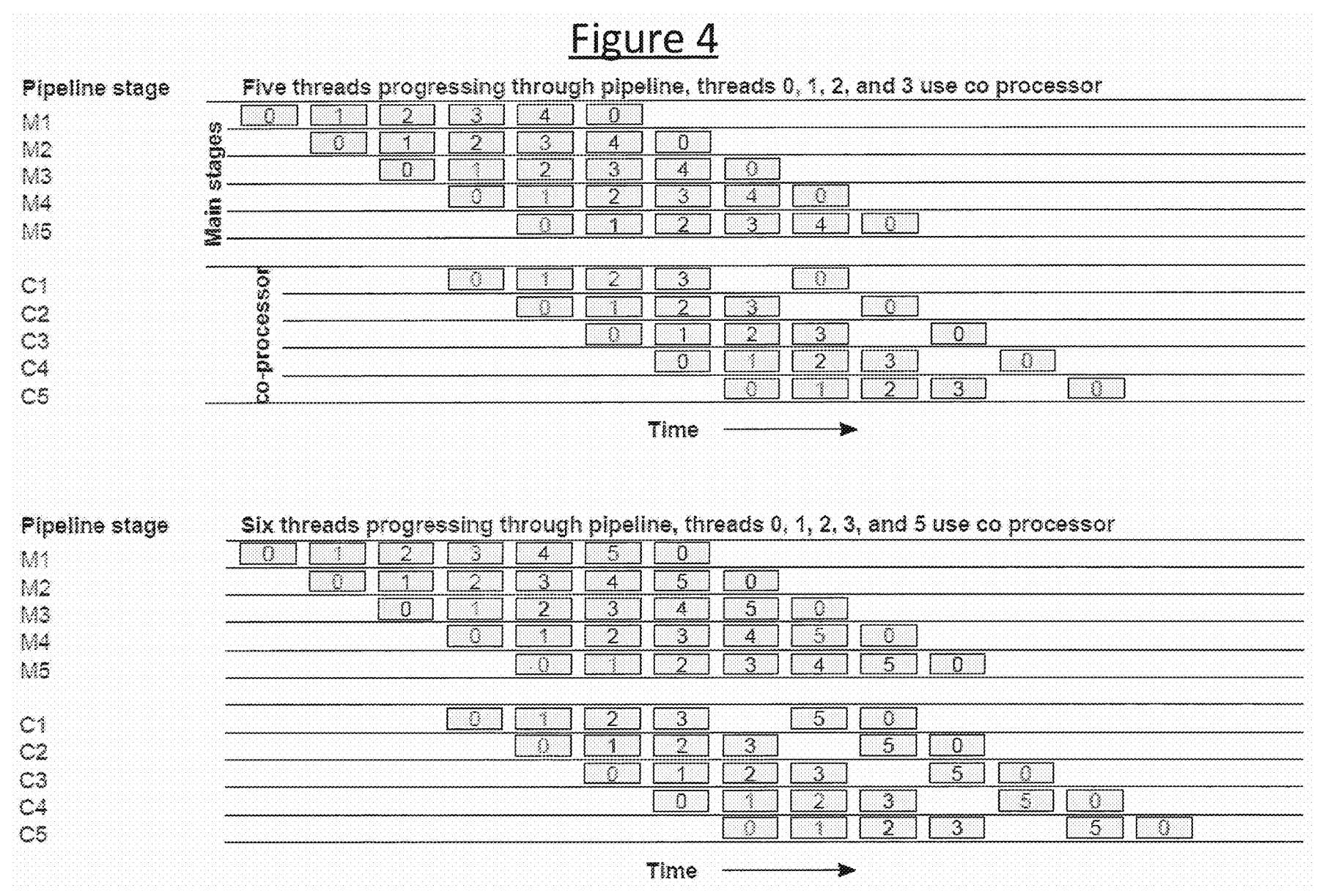

Some example situations where five and six threads progress through the system are shown in FIG. 4. Time progresses horizontally, the pipeline stages are shown vertically, and it is shown how each of the instructions passes through the pipeline. In this particular example, thread 4 does not use the co-processor 201, but all other threads do use the co-processor 201, and it can be seen how thread 0, for example, is both executing instruction 0 in the co-processor 201, whilst executing instruction 1 in the main pipeline 101. The programmer cannot observe that they are executed as such, it will appear that the whole of instruction 0 is executed prior to instruction 1; this is because the co-processor does not write into the main thread's status context, but only leaves results in the co-processor context 206.

A saving is achieved in terms of processor cycles because the co-processor instruction operates after the memory stage M4, M5—concurrently with the next instruction on the main processor 101. So it can run the co-processor pipeline 204 after the memory stages M4, M5, C1, C2, performing the operation (for example multiply) directly on the data read from memory, saving an extra issue cycle compared to normal operation of the processor where you would first load from memory into a register, and then perform a register to register operation.

The co-processor 201 can be configured to operate on wider units of data than the main processor. That is to say, the memory access stage C2 in the co-processor pipeline 104 has a wider interface to the data memory 102 (can access a larger word per cycle) compared to that of the memory access stage M5 in the main pipeline 104; and the internal registers of the compute stage(s) C3, C4 of the co-processor 204 are wider (can hold longer words) that that/those M3 in the main pipeline 104. In embodiments at least some of the registers in the co-processor register file 206 are also wider than any of the operand registers in the main processor's register file 106. As mentioned, in embodiments the co-processor supports vector instructions, such that it operate upon multiple elements of a vector in a given cycle. In this case at least some of the above-mentioned wider registers are vector registers. Combined with the fact that, at least some of the co-processor compute instructions can access memory 102 and perform their compute operations in a single cycle, this means the co-processor is capable of performing vector computations on relatively large quantities of data in parallel in a single cycle.

As such operations are very complex it would not be desirable to build an entire processor that only worked on this basis. However, by adding an extra pipeline portion (e.g. C1-C5), this adds the flexibility for the programmer or compiler to select between simple operations and complex (e.g. vector) operations on a per computation basis. For example, as mentioned, the main processor 101 can set-up a large vector in memory 102, leave the co-processor to perform the vector calculation, and then pick up the result from the memory 102; whereas if the same computation was performed using only simple instructions in the main pipeline 104, this would take a many more instructions over many more cycles, including a lot of load and store instructions to more values back and forth between the data memory 102 and the register file 106.

The disclosed arrangement is particularly beneficial for performing calculations where a large amount of input data results in a relatively small answer, e.g. a finite impulse response (FIR) calculation or a Fourier transform. In some cases one of the co-processor instructions could even be a vector dot product such that a large number of data elements from two or more vectors are reduced to a single scalar result in a single cycle.

Further, by implementing the additional complex-instruction functionality in a secondary co-processor pipeline 204 that branches off the main pipeline 104, this enables such functionality to be added whilst leaving the existing pipeline 104 in tact.

In embodiments the coprocessor instructions may be dual issued in the main processor pipeline 104, and may use some of the register ports, for example to get a memory address from the main register file 106. They will also use the main processor logic for fetching and computing memory addresses.

The compute instructions and the corresponding operations referred to herein may include one or more arithmetic instructions. Accordingly, any one of the compute stages M3, C4, C4 may comprise one or more arithmetic computation units for executing such instructions, such as a fixed point arithmetic unit (AU), logic unit (LU), arithmetic logic unit (ALU) or floating point unit (FLU). Preferably both pipelines can perform arithmetic operations, so both the main processor instructions and the co-processor instructions include arithmetic instructions, the compute stage M3 comprises an arithmetic unit and at least one of the co-processor compute stages C3, C4 comprises an arithmetic computation unit. Arithmetic refers to mathematical operations on numbers: e.g. multiply, add, divide, subtract, etc. Compute can constitute a much wider set: e.g. if operand 0 is true, then operand 1 is stored in the destination, else operand 2 is stored in the destination. Another example may be that the result is the input operand with all the bits flipped around from left to right.

Example co-processor instructions which the co-processor 201 may be configured to execute are as follows.
  VADD
  VLADD r7
  VLSADD r3, r10
  VECMUL r10

VADD is a vector add: it adds two implicit vector registers.

VLADD performs a vector load and add. It loads a vector from the address found in r7 (from the main thread registers 106), and adds that to an implicit vector register.

VLSADD performs a vector strided load and add. In this case two operands are passed from the main pipeline 104 to the co-processor pipeline 204, because the strided load requires a base and a stride. Both have been taken from main-pipeline registers in this example. A strided load-and-add works as follows: it adds the value in the base address to the value in the base address+the stride, plus the value in the address the base+two times the stride, etc. That is, it sums the values from a series of addresses offset form one another by the stride and (in this example) stores the result in an implicit register. A normal load would load a vector c from memory m at base address x by assigning v[i]:=m[x+i] for i over the vector range. A strided load would assign them from v[i]:=m[x+s*i] for i over the vector range, where s is a stride. This enables elements to be picked up from a column of a matrix for example.

Analogous operations can also be implemented for e.g. multiply, subtract and divide. For instance, VECMUL is a vector multiply. It indicates that register 10 of the main processor contains a memory address. The contents of this memory address are loaded by the co-processor and multiplied by the co-processor with a value in an implicit register.

In some embodiments the pipeline 204 of the co-processor 201 shall not be longer than the number of stages in the main pipeline 104. Or rather, neither pipeline 104, 204 is longer than the minimum number of slots required to be filled between two subsequent instructions on the same thread. For example, if an instruction of thread 0 is executed, then it takes four cycles before I the next instruction of thread 0 can be executed (to avoid dependency issues between instructions of the same thread). This is dictated by the length of the pipeline. If the co-processor pipe was longer than the main pipe, then it would be necessary to wait an extra cycle between the two instructions of thread 0. So the biggest length of both pipes governs how few threads are need to fill the machine. Keeping that number low is advantageous. Hence, in embodiments the co-processor pipeline 204 is kept the same or shorter than the main pipe 104 in terms of number of pipeline stages, otherwise an extra thread would be needed to keep the system full.

Figure 5:
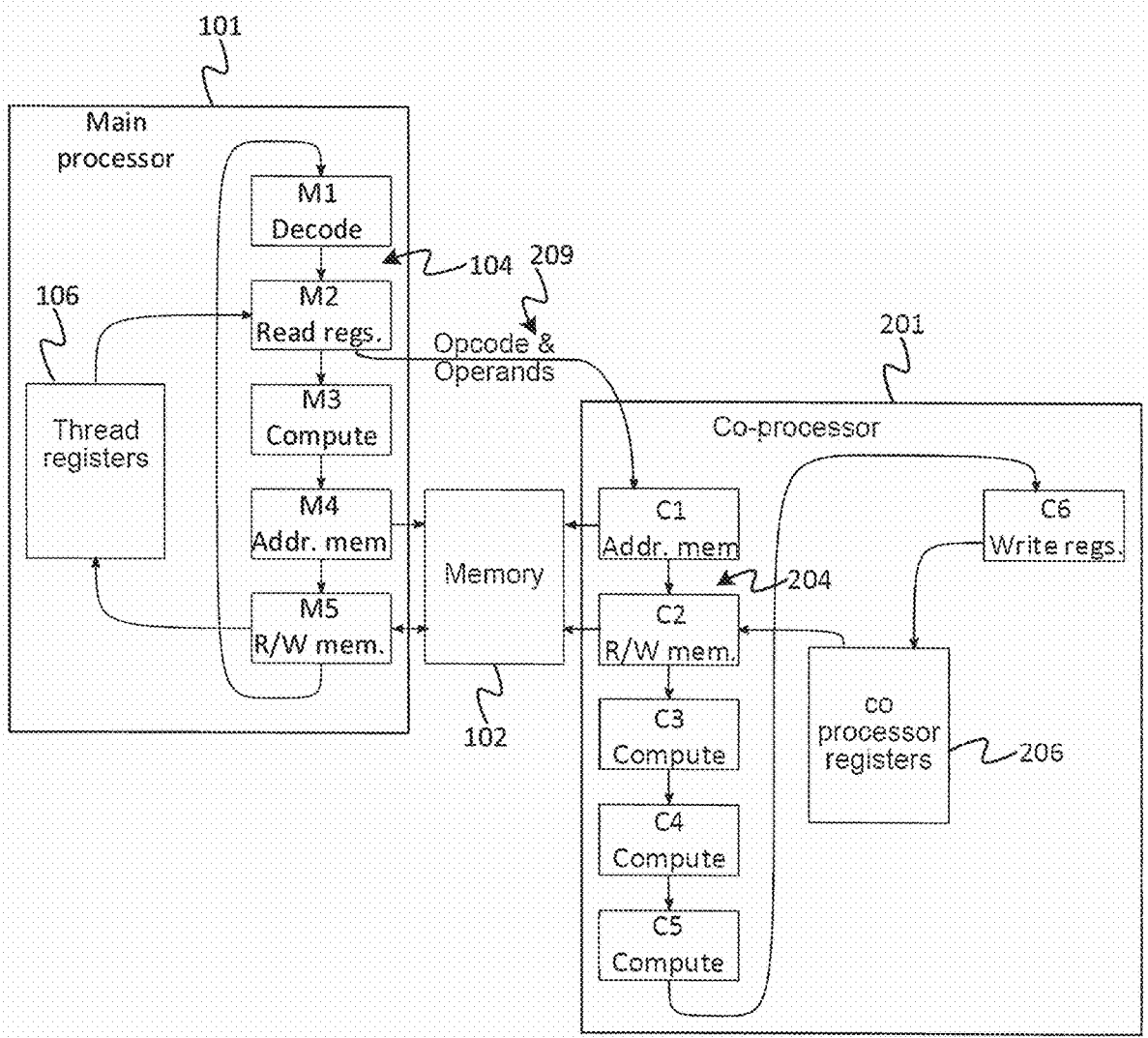
FIG. 5 is another schematic block diagram of a multi-threaded processor with a co-processor.

However if the co-processor pipeline 104 is longer, as is the case in FIG. 5, then the final stages of the co-processor pipeline can be "wrapped around" and must be able to execute overlapping with the first stages.

Figure 6:
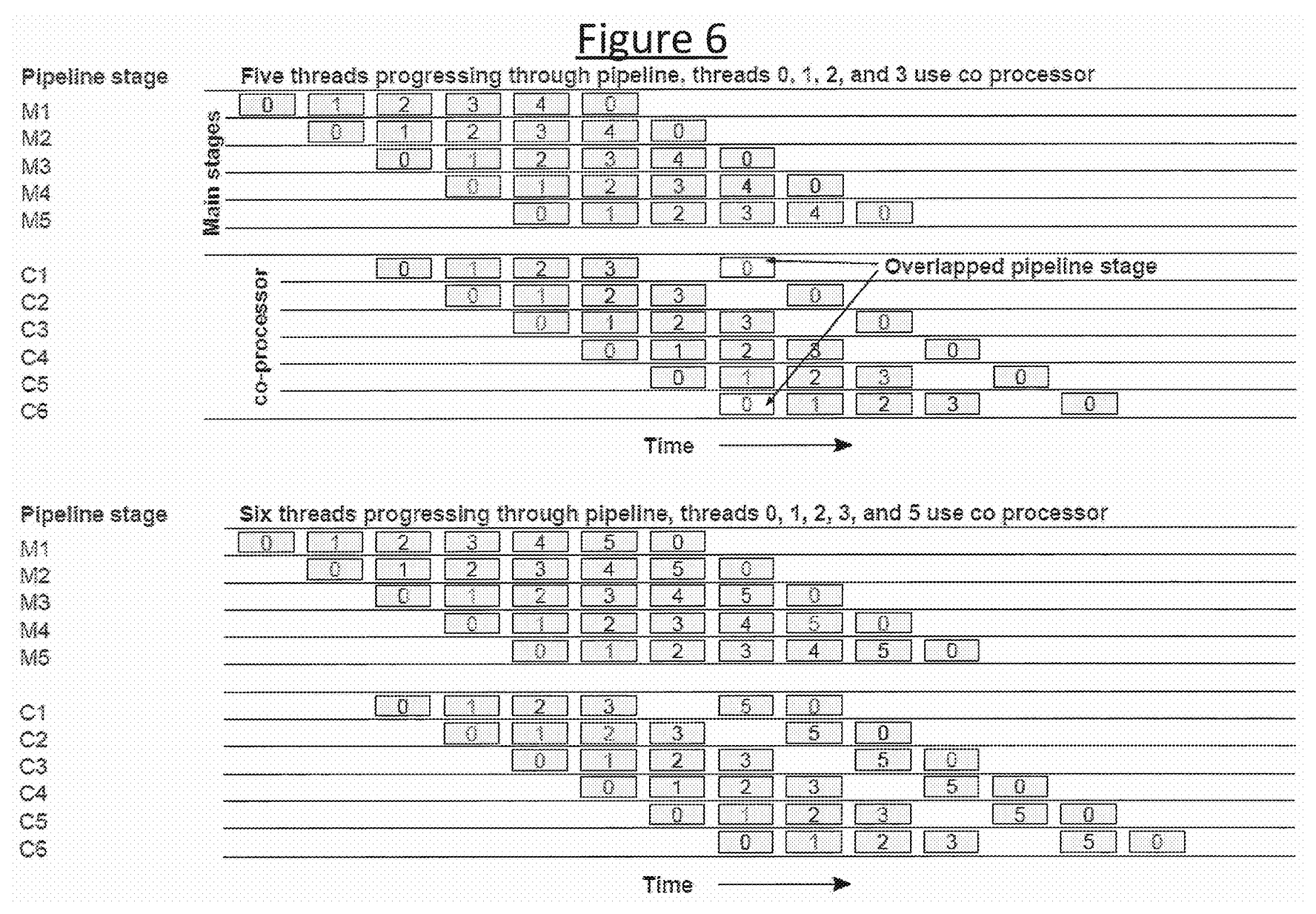

To illustrate, in the particular example of FIG. 5 the co-processor pipeline 204 is six stages long. Stage C1 addresses memory 102; stage C2 reads/writes to the memory 102 and reads from the co-processor register file 206; stages C3, C4 and C5 perform computation; and stage C6 writes to the co-processor register file 206. The co-processor memory access stages C2 and C3 are aligned with the main pipeline memory access stages M4 and M5. The flow of instructions through the pipeline is shown in FIG. 6.

Stage C6 writes results to the co-processor registers 206. As this stage is the sixth stage in the co-processor pipeline, it runs concurrent with the first stage C1 of the co-processor pipeline, that may potentially be executing the next instruction of the same thread. Assuming that these stages can overlap without conflict, then the same thread context can simultaneously execute instruction N in stage C6 and instruction N+1 in stage C1. If there is a conflict, for example if register values are read in C1, then forwarding paths may be required. That is to say, if the register read and register write were in the same pipeline stage, then the write may or may not take effect before the read takes effect. To keep causality in the program the write should appear to always be performed before the read. One way to do that is to make an explicit path that bypasses the read/write mechanism. If the processor is about to read the register that is about to be written, the forwarding path passes data straight to the read, while the data is written. This avoids the read of old data.

It will be appreciated that the above embodiments have been described by way of example only.

For instance, the second pipeline 204 could have different numbers of compute stages, from one upwards. And/or, the first pipeline 104 could have different numbers of stages in different combinations. E.g. the first pipeline 104 may have multiple first compute stages, or a compute stage following the memory access stage (s), or the first pipeline 104 could have no separate register read stage M2 and instead have the register read and compute done in same cycle. Any combination of these and/or other variants is possible. In further alternative or additional variations, the first and/or second pipeline 104, 204 could have the memory access and memory read/write stages M4, M5 or C1, C2 combined, so as to do addressing and read/write in the same cycle.

Preferably the second pipeline 204 uses a separate register file 206, separate from the register file 106 used by the first pipeline 104 in order to avoids pressure on the main register set 106, i.e. to avoid possible contention between the two register sets 106, 206. Also by providing the second pipeline 204 with its own, bespoke, register set enables it to have extra wide registers (e.g. for double precision floating point, or vectors), and fewer registers. However, these points are not essential in all possible embodiments. Alternatively for example the first and second compute stages could share the same register file, and the compiler may ensure instructions i and i+1 from a given thread N don't try to use the same registers in a conflicting way.

Further, it is not essential to put the second compute stage(s) C3, C4 in a separate co-processor 201, or even to provide them with their own separate memory access stage(s) C1, C2. Instead for example, another implementation would be to use the memory access stage(s) M4, M5 of the first pipeline to perform the memory access of the co-processor type compute instructions (the second type of compute instruction), arrange the second compute stage(s) C3, C4 after M5 in the first pipeline 104, and have the co-processor instructions skip M3. Semantically, the operation is identical to wrapping the co-processor pipeline around the original one, and putting it at the bottom of it. This still achieves the saving that the instruction operates after the memory stage—concurrently with the next instruction in the first pipeline. So it can be processed by the second compute stage(s) after the memory stages, perform the operation (for example multiply) directly on the data read from memory, saving an extra issue cycle compared to normal operation of the processor where you would first load from memory into a register, and then perform a register to register operation. Acting directly on data read from memory saves a cycle compared to a separate load and compute instructions.

Where a separate co-processor 201 is used, this means separate at least in that it has own memory access stage(s) and register file 206, but not necessarily that it is on different chip. In embodiments in fact the co-processor is implemented on the same chip (same die) as the first processor 101. This adds a saving in the processor design as the co-processor can be added on to an existing design while preserving the original existing pipeline. In some alternative embodiments, the co-processor 201 may however be implemented on a different chip (die) on the same IC package, or even a different chip in a different IC package on the same circuit board.

In yet further alternative or additional variants, the applicability of the techniques herein is not limited to multi-threaded processors. In general pipelining can be beneficial in a non-multithreaded scenario.

Other variants or applications of the presently disclosed concepts may become apparent to a person skilled in the art once given the disclosure herein. The scope of the present disclosure is not limited by the above-described embodiments but only by the accompanying claims.

The invention claimed is:

1. A pipelined processing system for executing instructions, wherein for each instruction executed, the instruction passes successively through a series of pipeline stages in a respective successive processor cycle per stage, the system comprising:
    a data memory;
    a first processor comprising a first register file and a first execution pipeline, the first execution pipeline comprising a series of first pipeline stages including at least a decode stage followed by one or more first compute stages and one or more first memory access stages; and
    a co-processor comprising a second execution pipeline branching from the first pipeline via an interface between the first and second processors, the second pipeline comprising one or more second memory access stages followed by one or more second compute stages;
    wherein the decode stage is configured to decode instructions from an instruction set comprising a first subset of instructions and a second subset of instructions, wherein i) for each instruction of the first subset when executed, the instruction passes successively through the stages of the first pipeline in respective processor cycles, and ii) for each instruction of the second subset when executed, the instruction passes successively through the decode stage of the first pipeline, and is subsequently redirected via said interface to pass through the one or more second memory access stages and then the one or more second compute stages of the second pipeline, instead of the one or more first memory access stages and one or more first compute stages of the first pipeline;
    wherein the first subset comprises a load instruction which causes the one or more first memory access stages to load data from the data memory into a register of the first register file, and further comprises at least one compute instruction of a first type which causes at least one of the one or more first compute stages to perform a compute operation on the data loaded into one of the registers of the first register file; and
    wherein the second subset includes at least one compute instruction of a second type which, without requiring a separate load instruction to first load data from the data memory into a register of a register file, instead causes the one or more second memory access stages to read an item of data from the data memory directly into an internal register of one of the one or more second compute stages in the processor cycle or cycles of the one or more first memory access stages, then causes at least one of the one or more second compute stages, in at least one respective subsequent processor cycle, to perform a co-processor compute operation on the item of data held in said internal register.

2. The processing system of claim 1, wherein the co-processor comprises a second register file separate from the first register file, wherein the second type of compute instruction writes a result of its compute operation to a destination register of the second register file.

3. The processing system of claim 1, wherein the compute instruction of the second type causes the decode stage of the first pipeline to send to the second pipeline via said interface: an indication of the co-processor compute operation to be performed, and a memory address from which to access the said item of data upon which the co-processor compute operation is to be performed.

4. The processing system of claim 3, wherein said indication of the co-processor operation takes the form of a decoded opcode of the compute instruction of the second type, as decoded by the decode stage of the first pipeline.

5. The processing system of claim 3, wherein at least one of the cycle or cycles of the one or one or more first compute stages is used to send said indication and address to the second pipeline in the co-processor.

6. The processing system of claim 1, wherein the one or more second compute stages are a plurality of second compute stages.

7. The processing system of claim 1, wherein the first processor is operable to execute a number of concurrent threads up to a maximum number, by representing a state of each thread in a respective set of context registers in the first register file and issuing instructions from the different threads into the decode stage of the first pipeline in an interleaved manner.

8. The processing system of claim 7, comprising a forwarding path arranged to avoid dependency conflicts between instructions of the same thread when the number of pipeline stages in the first pipeline or second pipeline is greater than the number of currently executing concurrent threads.

9. The processing system of claim 7, wherein the co-processor is also a multi-threaded processor.

10. The processor of claim 9, wherein the second register file also comprises context register sets for representing a program of different ones of the threads when instructions from the second subset are passed to the co-processor.

11. The processing system of claim 1, wherein the co-processor is a vector processor, said item of data taking the form of a vector, said internal register being a vector register, and the compute operation performed by the instruction of the second type being a vector operation.

12. The processing system of claim 2, wherein either or both of said internal register and said destination register used by the compute instruction of the second type is wider than the register in the first register file used by the compute instruction of the first type.

13. The processing system of claim 4, wherein the second pipeline does not comprise a decode stage, and instead the decode stage in the first pipeline is arranged to decode the opcode of the compute instruction of the second type, said indication comprising the opcode in decoded form as decoded by the decode stage of the first pipeline.

14. The processing system of claim 1, wherein the one or more first compute stages are followed by the one or more first memory access stages.

15. The processing system of claim 14, wherein the first pipeline comprises a register read stage between the decode stage and the one or more compute stages, wherein the first type of compute stage causes the register read stage to read the data to be operated upon from the first register file.

16. The processing system of claim 1, wherein the compute instruction of the first type causes one of the one or more first memory access stages to write a result of its compute operation to a register of the first register file.

17. The processing system of claim 2, wherein the second pipeline comprises a register write stage following the one or more second compute stages, arranged to perform said write to the register of the second register file.

18. The processing system of claim 2, wherein the destination register is implicit.

19. The processing system of claim 11, wherein the compute operation performed by the compute instruction of the second type comprises one of:
    add together vectors from a memory addresses in two implicit registers and store the result in the destination register;
    add a vector from a memory address found in a register specified by an operand of the instruction of the second type to a vector from a memory address found in an implicit register;
    add together vectors from addresses in two registers specified by operands of the instruction of the second type;
    multiply together vectors from memory addresses in two implicit registers and store the result in the destination register;
    multiply a vector from a memory address found in a register specified by an operand of the instruction of the second type to a vector from a memory address found in an implicit register;
    multiply together vectors from addresses in two registers specified by operands of the instruction of the second type;
    a vector strided load and add, which adds together vectors from a series of memory addresses starting from a base address and offset from one another by a stride, and stores the result in an implicit register, the base address and stride being taken from register specified by operands of the instructions; or
    a vector strided multiply and add, which multiplies together vectors from a series of memory addresses starting from a base address and offset from one another by a stride, and stores the result in an implicit register, the base address and stride being taken from registers specified by operands of the instructions.

20. A method of operating a pipelined processing system for executing instructions, wherein for each instruction executed, the instruction passes successively through a series of pipeline stages in a respective successive processor cycle per stage, the system comprising:
    a data memory;
    a first processor comprising a first register file and a first execution pipeline, the first execution pipeline comprising a series of first pipeline stages including at least a decode stage followed by one or more first compute stages and one or more first memory access stages; and
    a co-processor comprising a second execution pipeline branching from the first pipeline via an interface between the first and second processors, the second pipeline comprising one or more second memory access stages followed by one or more second compute stages;
    wherein the method comprises:
    operating the decode stage to decode instructions from an instruction set comprising a first subset of instructions and a second subset of instructions, wherein i) for each instruction of the first subset when executed, the instruction passes successively through the stages of the first pipeline in respective processor cycles, and ii) for each instruction of the second subset when executed, the instruction passes successively through the decode stage of the first pipeline, and is subsequently redirected via said interface to pass through the one or more second memory access stages and then the one or more second compute stages of the second pipeline, instead of the one or more first memory access stages and one or more first compute stages of the first pipeline;
    wherein the first subset comprises a load instruction which causes the one or more first memory access stages to load data from the data memory into a register of the first register file, and further comprises at least one compute instruction of a first type which causes at least one of the one or more first compute stages to perform a compute operation on the data loaded into one of the registers of the first register file; and
    wherein the second subset includes at least one compute instruction of a second type which, without requiring a separate load instruction to first load data from the data memory into a register of a register file, instead causes the one or more second memory access stages to read an item of data from the data memory directly into an internal register of one of the one or more second compute stages in the processor cycle or cycles of the one or more first memory access stages, then causes at least one of the one or more second compute stages, in at least one respective subsequent processor cycle, to perform a co-processor compute operation on the item of data held in said internal register.

\* \* \* \* \*